US006847305B1

(12) United States Patent
Buck (10) Patent No.: US 6,847,305 B1
(45) Date of Patent: Jan. 25, 2005

(54) IN-TANK FUEL LEVEL DATA NETWORKS FOR RETAILER DATA

(76) Inventor: Michael Buck, 122 E. Colleen, Gardner, KS (US) 66030

(*) Notice: Subject to any disclaimer, the term of this patent is extended or adjusted under 35 U.S.C. 154(b) by 14 days.

(21) Appl. No.: 10/601,740

(22) Filed: Jun. 24, 2003

Related U.S. Application Data (63) Continuation of application No. 09/952,020, filed on Sep. 11, 2001, now abandoned.
(60) Provisional application No. 60/232,437, filed on Sep. 12, 2000.

(51) Int. Cl.[7] .............................................. H04Q 9/00
(52) U.S. Cl. .................... 340/870.07; 700/283; 705/28; 137/236.1
(58) Field of Search ................. 340/870.07; 137/236.1; 700/244, 283; 705/28

(56) References Cited

U.S. PATENT DOCUMENTS

| 6,112,981 | A | 9/2000 | McCall | ....................... 235/375 |
|---|---|---|---|---|
| 6,321,984 | B1 | 11/2001 | McCall | ....................... 235/381 |
| 6,351,689 | B1 * | 2/2002 | Carr et al. | ................... 700/244 |
| 6,370,515 | B1 | 4/2002 | Diamond et al. | ............. 705/28 |
| 6,442,448 | B1 * | 8/2002 | Finley et al. | ................ 700/231 |
| 6,546,314 | B1 | 4/2003 | Carr et al. | ................... 700/244 |

OTHER PUBLICATIONS

John N. Daigle, "Computer Communication Networks: General Networking Concepts," *The Engineering Handbook*, Chapter 128.1, pp. 1338–1392 (CRC/IEEE Press, R.C. Dorf. Ed., 1995).

* cited by examiner

*Primary Examiner*—Timothy Edwards
(74) *Attorney, Agent, or Firm*—Jonathan A. Bay (57) ABSTRACT

A method and system for communications of fuel data, including fuel depletion data, in regards of fuel storage tanks includes an electronic communicator linked to a sensor associated with the storage tank for communicating over a communications network the fuel data to innumerable other parties connected on the communications network.

20 Claims, 8 Drawing Sheets

IN-TANK FUEL LEVEL DATA NETWORKS FOR RETAILER DATA

CROSS-REFERENCE TO RELATED APPLICATION(S)

This application is a continuation of U.S. patent application Ser. No. 09/952,020, filed Sep. 11, 2001, now abandoned, which claims the benefit of U.S. Provisional Application No. 60/232,437, filed Sep. 12, 2000, which are incorporated herein by this reference.

A portion of the disclosure of this patent document, the provisional or priority application(s) that provide a priority basis for this patent document, and/or any referenced appendix(ices) thereof contain(s) material which is subject to copyright protection. The copyright owner(s) has(have) no objection to facsimile reproduction by anyone of the patent document or the patent disclosure, or the matters in the file(s) comprising the prosecution history of the patent document, as any of the foregoing appears with Patent & Trademark Office files or records, but otherwise reserve(s) all copyright rights whatsoever.

BACKGROUND OF THE INVENTION

The invention relates to a method and system for communications of fuel data, including fuel depletion data, over a communications network.

The invention provides advantages over the prior art for the U.S. retail gas or service station industry. It's very big industry. The typical car- or truck-owning consumer might drive 24,000 miles a year. Given a fuel efficiency of 16 miles per gallon, then that's consumption like 1,500 gallons a year a person.

Assuming further an average purchase of 15 gallons every gas stop, our representative consumer here is making over one hundred stops a year. That's twice a week. Regardless of these assumptions, all of us are very familiar with the chore of gassing up our car (or truck) at a filling station.

Nowadays a gas stop generally means pulling over to a convenience store. Convenience stores offer fuel sales in combination with various other non-petroleum products. In many respects, convenience stores can be reckoned as miniaturized versions of grocery stores except having less variety of product at higher prices. Over the last decade gasoline has been selling down as low as $1.25 a gallon. At the same time, a convenience store might sell a sixteen ounce cup of coffee for $1.25. In equivalent terms, the coffee sells for $10.00 a gallon. Someone has quipped that, convenience stores give gas away in order to sell coffee. Generally, convenience stores sell all product other than the fuel at lucrative margins. Which is odd, because retailing fuel is a very sophisticated enterprise. It requires expensive on-site equipment, an expensively-equipped wholesale chain, and highly-skilled equipment vendors. In stark contrast, the store clerks (who are far more visible to the public) are nowhere nearly as skilled.

Despite all the sophistication in retail petroleum sales, new convenience stores are showing up everywhere these days, and selling fuel at such basement prices that the rest of the world must surely be envious.

Figure 1:
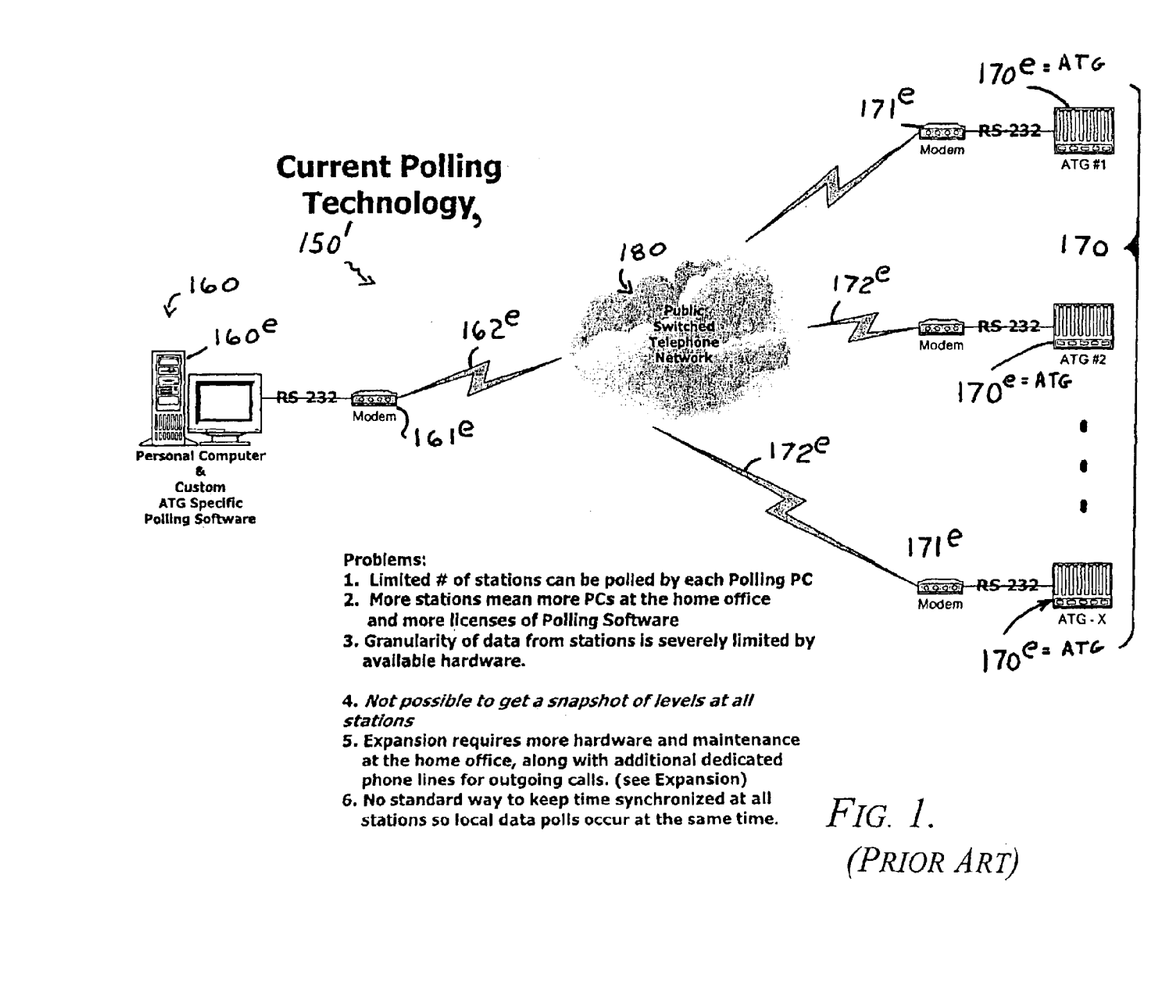
FIG. 1 is a diagrammatic view of technology in accordance with the prior art for polling data of in-tank fuel levels, wherein polling can be likened to "pulling" data.

FIG. 1 shows some technical aspects of the prior art way (indicated as 150$^1$) of retailing fuel at such basement prices. More particularly, FIG. 1 shows a prior art way 150$^1$ how a remote party 160 such as a fuel wholesaler (or transport company or dispatcher) might research the in-tank fuel levels among a distributed population of retail fuel stations 170, including for example convenience stores. Pause can be taken for a moment to consider some typical parties involved in retailing fuel to the public. For brevity's sake, consider the following three:—retailers, wholesalers, and equipment vendors. An example retailer is represented by the convenience store owner (or management). The equipment vendor is typically an equipment dealer, whose responsibilities likely include the original installation of (and then thereafter maintenance over) the bulk tanks as well as pumping and piping equipment that are on-site at the retailer's premise. The wholesaler is likely a transport company that owns a fuel depot as well as tanker trucks to dispatch to the various retailers in its service area in order to replenish them as needed.

At some original time, a convenience store site of the distributed population 170 undertakes a major construction project during which that one store gets installed with equipment comprising for example, bulk storage tanks (either in-ground or above-ground), pumps (ie., actual pumps, usually in-tank, and not what consumers refer to as 'pumps'), pipelines, and dispensers (ie., these being what consumers refer to as 'pumps').

Given the foregoing, then a repetitive cycle gets underway. The wholesaler 160 dispatches a tanker truck to the convenience store to "stock" (eg., supply or fill) for the first time the bulk storage tanks. The convenience store sells its fuel supply until any one of its several bulk tanks near depletion. Under optimal circumstances, the/a tanker truck returns in a time frame between when the convenience store is low but not dry on a given grade or fuel-type (eg., different blends as well as diesel too for example and not just gasoline). That way, the tanker truck's delivery route can be optimized. In other words, just-in-time re-fueling is an optimized utilization of the tanker truck. Corresponding efficiencies are achieved for the convenience store if the/a tanker truck returns only as often as necessary. On a more infrequent basis still, the equipment vendor periodically visits the on-site equipment, to perform maintenance and the like, on either a schedule or only after called on an as needed basis.

As FIG. 1 shows, the in-tank fuel level of each given tank is measured and logged by an automated tank gauge (eg., "ATG"). Since none are illustrated, pause is taken for another moment to consider what these ATG's look like. An example and common prior art ATG is produced by Veeder-Root (again, none illustrated except diagrammatically). A Veeder-Root ATG (as representative of others) relies on a permanently-installed measuring stick disposed inside the bulk fuel tank. The measuring stick extends vertically between a base resting on the tank floor and a crown as high as the tank ceiling. The measuring stick carries instrumentation such as and without limitation upper and lower sliding floats.

The lower float is preferably lighter-than-water but sinks in fuel and hence floats on the fuel-water interface. The upper float is preferably lighter-than-fuel and hence floats on the air-fuel interface. Position sensors are incorporated in the stick and/or floats to provide signals corresponding to float position. These signals are communicated to a controller 170$^{e=ATG}$. Hence float position in combination with temperature measurement allows some entity—either the attached ATG controller 170$^{e=ATG}$ or a remote computer—to correspond an in-tank fuel level with the float and temperature data. The controller 170$^{e=ATG}$ attached to the ATG includes a processor for executing data logging services including storing logged data on a local storage device, as well as executing services for communicating with other devices.

Now to turn to FIG. 1 in earnest, it shows a prior art way $150^1$ how a remote communications center 160 can remotely research in-tank fuel levels. The remote communications center 160 can be reckoned as a "central office," like that administrated over or on behalf of a transport company. One of the earliest objects in the prior art has been to automate the process $150^1$ in order in particular to eliminate reliance on a store clerk.

Generally, the central communications office 160 is depicted as a polling computer $160^e$. This may simply be about any general-purpose computer including a personal computer. The polling computer $160^e$ depicted in FIG. 1 is the visible part of the remote central office 160. The polling computer $160^e$ is entrusted with the responsibility of monitoring the in-tank fuel levels of the population 170 of automated tank gauges in its service area. In the drawing, these are depicted as ATG #1, ATG #2 and so on, through ATG X. For practical reasons (to be explained more particularly below), X is preferred to be about no more than ten.

Typically, there is much preliminary work to do to get this scheme up and running. First thing is, of course, that each fuel tank has to be associated (eg., instrumented) with an ATG. Installing and certifying ATG's—in fact about most work in and around the bulk tanks, pumps, pipelines and dispensers—is work for experts only. Although, despite there being a high need for expertise, equipment vendors as an ordinary necessity for doing business generally posses the requisite expertise.

The circuitry of the ATG needs to have, not only the computer services of an on-board processor and storage medium but also, an on-board modem, or at least be connected to one (modem indicated at $171^e$). The modem $171^e$ needs to be linked to a telephone line $172^e$ from the public (ie., public-switched) telephone network 180. The polling computer $160^e$ also needs a modem $161^e$ and telephone line $162^e$ as well. The polling computer $160^e$ needs to be pre-programmed with all the identities of the population 170 over which it is responsible of controllers $170^{e=ATG}$ for ATG #1 through ATG X. Also, the polling computer $160^e$ needs a telephone number for each of ATG #1 through ATG X. Additionally, the polling computer $160^e$ will need to have installed on it the particular communications software for the various ATG's under its responsibility in order to enable the polling computer $160^e$ to poll (eg., think of this as "pull") information from each particular ATG controller $170^{e=ATG}$ (ie., no matter which manufacturer or polling software version of a given manufacturer). This polling software is proprietary to the ATG manufacturers. They value their proprietary software and charge license fees for the use of such.

Given the foregoing set-up, the polling sequence transpires as follows. The polling computer $160^e$ places a phone call to ATG #1. If the site's phone line $172^e$ is open, the modem $171^e$ is expected to answer. Perhaps the phone line $172^e$ is busy because the line $172^e$ used to contact ATG #1 serves principally as the retail store's main if not only telephone line, and at that moment the store clerk is tying up the phone line (with a personal call?). Even if the polling computer $160^e$ gets as far as the modem $171^e$, ATG #1's controller $170^{e=ATG}$ might be midway in a data logging cycle of its own, and therefore is unavailable for polling communications. If for any of these or other reasons the polling computer $160^e$ cannot successfully poll ATG #1, then the polling computer $160^e$ incrementally advances through its cycle by proceeding onwards to ATG #2, and so on, through ATG X.

There are various shortcomings associated with the prior art polling technology. One is that, as a practical matter, a given polling computer $160^e$ can only usefully poll a limited number of ATG's. For example, if a polling cycle for eight ATG's can be completed every half hour, a polling cycle for one hundred ATG's cannot be completed until after about six hours. Regardless if eight or a hundred, experience suggests that there is only likely to be about a 70–80% success rate. If the polling computer $160^e$ polling a hundred sites, the cycle time of six hours for a success rate of only three-out-of-four of the ATG's provides data granularity that is far too coarse in terms of predicting just-in-time re-fueling. Hence one shortcoming is that the central office 160 must guard against over-burdening one polling computer $160^e$ with too much responsibility over too many ATG's. A further shortcoming of the foregoing is that it is not possible to get a "snapshot" of the in-tank fuel levels at all sites of the population 170, as bracketed within any reasonably small frame of time. At any given instant the data for some of sites will be as stale as one, two, three or more cycle times. That is, even if the polling computer $160^e$ is responsible for only eight ATG's, at every instant some data is as stale as thirty minutes. However, in other cases the data will be at least as stale as ninety minutes and approach as stale as nearly one-hundred-twenty minutes if there are just three successive busy signals for that given one ATG.

An additional shortcoming is that there is no standard way to keep time synchronized among all the controllers $170^{e=ATG}$ of the population 170. Synchronized time is important so that local data logging functions take place across the population 170 on a synchronized schedule. The local clocks usually provided with ATG controllers $170^{e=ATG}$ are unreliable. They are no better than the personal computer clocks of the day which for some reason are notoriously inaccurate. Experience has discovered many examples of a several hour drift over a few months. Whereas the polling computer $160^e$ might accurately know the time it calls any given ATG, the polled data is time-stamped by the onboard clock of that ATG controller $170^{e=ATG}$ which, as said, is unreliable.

Figure 2:
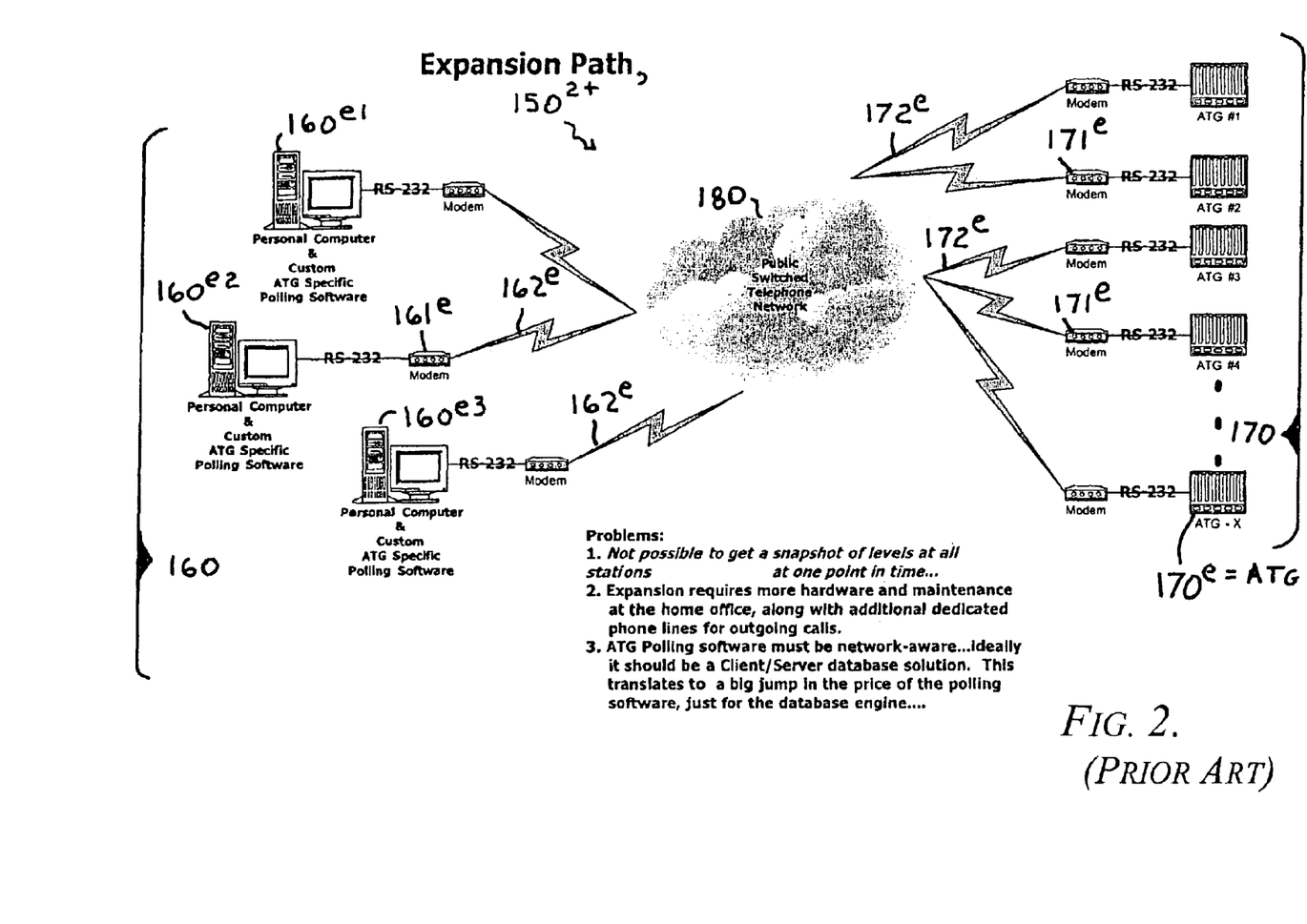
FIG. 2 is a diagrammatic view of how the prior art polling technology of FIG. 1 has been characteristically adapted to serve a burgeoning or "expanded" population of fuel tanks, wherein this can be referred to as polling "expansion" technology in accordance with the prior art.

A more troubling shortcoming involves expansion. FIG. 2 shows some of the expansion shortcomings that trouble the prior art. As previously said, the central office 160 is well-advised to guard against over-burdening one polling computer with responsibility over too many ATG's. Expanding the responsibility of one polling computer over too many ATG's overwhelms that polling computer. FIG. 2 shows a prior art way $150^{2+}$ of accomplishing expansion. In FIG. 2, the data-destination center 160 (eg., the central office) has expanded by adding a second and third polling computer $160^{e2}$ and $160^{e3}$ to share in the workload of the first $160^{e1}$.

A moment will be taken to describe the structure and set-up of this multi-tasking network $150^{2+}$ Again each polling computer may be as simple as about any general-purpose computer including a personal computer. The three polling computers are collectively responsible for monitoring the origin points of data:—namely, the in-tank fuel levels of automated tank gauges ATG #1, ATG #2, ATG #3, ATG #4 and so on, through ATG-X. In FIG. 2 it is assumed that X is greater (eg., much greater) than ten.

As was described in connection with FIG. 1, each fuel tank (not shown) needs to be associated with an ATG. The ATG has an attached controller $170^{e=ATG}$ that either incorporates or is at least connected to a modem $171^e$. The modem $171^e$ needs to be served by a telephone line $172^e$ from the public telephone network 180. Each polling computer $160^{e1}$ through $160^{e3}$ needs a modem $161^e$ too and a dedicated telephone line $162^e$.

However, in contrast to FIG. 1, what FIG. 2 shows is different is as follows. No single one polling computer is responsible for all of ATG's #1 through X. Instead, the workload is divided into thirds (ie., per capita). Assuming one hundred ATG's, the workload might be divided like this. That is, the first polling computer $160^{e1}$ is responsible for ATG #1 through ATG #33 (#33 not specifically indicated in the drawing), the second polling computer $160^{e2}$ is responsible for ATG #34 through ATG #66, and third polling computer $160^{e3}$ is responsible for ATG #67 through ATG-X (and, in accordance with the previous disclaimer, #'s 34, 66 and 67 are not specifically indicated in the drawing). Similar to FIG. 1, each polling computer needs to be pre-programmed with the identities of each of the ATG's it is solely responsible for. Also, each polling computer needs to be pre-programmed with the telephone number for each ATG under its responsibility. Additionally, each polling computer will need to be installed with the particular communications software necessary to enable that polling computer to poll information from each particular ATG under its responsibility (and again, this software is specific in terms of manufacturer and/or which version of polling-software of a given manufacturer).

Given that set-up, the polling sequence transpires as follows. The first polling computer $160^{e1}$ places a phone call to ATG #I. The second and third polling computers $160^{e2}$ and $160^{e3}$ are independently allowed to poll ATG #34 and ATG #67, respectively (and, in accordance with the previous disclaimers, site #'s 34 and 67 are not specifically indicated in the drawing). Provided that the dialed phone lines $172^e$ aren't busy (or the dialed ATG is not personally occupied doing something else), the polling computers 'poll' the data (eg., which can be reckoned as 'pulling' the data) and then cycle through the ATG's under their responsibility in order to poll the rest of the data. Unlike FIG. 1 in which a single polling computer would require six hours to cycle through one hundred ATG's, in FIG. 2 presumptively the three polling computers can cycle through the one hundred ATG's in two hours:—ie., a third of the time. However, just like in FIG. 1, the polling success rate is not any better than what experience finds as about 70–80%.

In spite of the solutions provided by this prior art way of expanding the number computers responsible for polling a population 170 of ATG's, there are still shortcomings in it all. As was identified in connection with FIG. 1, it is still not possible to get a snapshot of the fuel levels at all sites 170. Any given instant finds the data for some sites as stale as one, two, three or more cycle times. Also, there is no standard way to keep time synchronized at the ATG controllers $170^{e=ATG}$ at all sites so that local data logging functions take place on a synchronized schedule.

More problematical, expansion requires the central office 160 to acquire more hardware $160^{e2}$ and so on as well as acquire leasing of additional dedicated phone lines $162^e$ for the outgoing phone calls. And needless to say, the expansion in hardware requires an increase in the time from technicians for maintenance and attention.

Another issue with the FIG. 2 arrangement is that, the proprietary ATG polling software should be network-aware. Ideally this should be accomplished by a client/server database solution. In terms of cost to the central office 160, this translates to a big jump in cost and not merely because of the incrementally higher-dollar price of the license fees for ATG-specific network-versions of the polling software, but also for the database engine. However, the three polling computers are not truly networked because of the independent assignment to each to tackle each's assigned task load. Consequently, the data polled by each polling computer is not easily assembled together in a unified report. Each polling computer writes reports that are based on just the data from its own sites. Hence this arrangement in FIG. 2 is not easily assembled to provide overall reports.

Given the foregoing, what is needed is a solution to the shortcomings of the prior art. More particularly, there is a need to provide snapshot of bulk tank fuel levels at intervals that allow accurate fuel usage trends for "lower-half of the tank" scheduling of deliveries. There is another need for retrieval of compliance data and backup of information for all sites. There is an additional need for alarm information for service call dispatching and fuel dispatching. There is an alternate need for automated compliance data retrieval and processing for E.P.A. compliance.

There are various other needs including more readily adapting the network in face of problems consequent from burgeoning expansion of the parties on the network.

SUMMARY OF THE INVENTION

It is an object of the invention to provide retail fuel stations with data communicators that act independently on their own to propagate (eg., push) the data to selected data-destination parties.

It is another object of the invention the foregoing push methodology in combination with the communications network it is implemented on accommodates ready expansion over not just a burgeoning population of retail fuel stations (ie., data-origin parties), but also an expanded number of data-destination parties.

It is an additional object of the invention that the parties to the invention propagate their communications (importantly, the data) by a message propagating technology known as message-switching (ie., in contrast to circuit or packet switching), common examples of which include SMTP e-mail and CCITT X.400 series e-mail.

It is an alternate object of the invention to utilize communications networks that provide intermediate storage of message traffic for situations in which thousands and thousands of parties to the invention flood the communications network with thousands and thousands of messages on the same pre-arranged cue.

It is a further object of the invention that the data-origin and -destination parties are provided with utilities to synchronize with a universal clock in order that each party keep good local time for time-stamping and -correlating purpose.

It is an alternative object of the invention to provide instantaneous snapshots of the in-tank fuel levels of all the sites on the network according to pre-arranged cycles.

It is a further other object of the invention to switch the responsibility of a busy telephone line at the retail fuel station as being a problem for the data-destination party to work around, to a problem for the data-origin site to work around. Presumably, the data-origin site is under-tasked anyway, or at least relative to the data-destination site, and is nearer the problem in any event.

It is a further additional object of the invention to eliminate the need to pre-program the central office with the identities and/or addresses of all the data-origin parties on the network because the invention has the data-destination party sitting passively awaiting for new data-origin parties to contact it. Afterwards, the data-destination party creates an account for the new data-origin party(ies) and then might monitor their message cycles in order to detect failure to meet the schedule. Indeed it is an aspect of the invention to assign one data-destination party on the network with duties over monitoring non-reporting sites which miss their cycle.

It is a further alternate object of the invention to change the party which hosts the proprietary communications software specific to the ATG from being the central office in accordance to the prior art to the data-origin site in accordance with the invention. Not only is there no need under the invention for such proprietary software at the data-destination site, but furthermore there is no need for network-aware versions thereof because the invention also eliminates all need for surplus computers parallel- or multi-tasking alongside a given one in order to divide up and shotgun through at a faster pace the slow and cumbersome polling task.

It is a further alternative object of the invention to simplify the computer resources required to obtain reports on the data.

It is a yet a further other object of the invention to more completely eliminate any role for or reliance on the store clerks that staff the retail fuel stations.

These and other objects and aspects of the invention are provided by a a method allowing a remote party to research the in-tank fuel levels of the bulk fuel tanks of a distributed population of retail fuel stations. The preferred method involves configuring a distributed population of retail fuel stations as data-origin parties of in-tank fuel level data from the on-premise bulk fuel tanks as obtained from controllers of automated tank gauges (ATG's) as well as being an origin of data obtained from some other on-premise device or sensor. It further involves providing each data-origin party with an on-premise data communicator that is associated with and polls at least one on-premise ATG controller and at least one on-premise some other device or sensor for data thereof, and pre-programmed with a cyclic schedule and stores locally at least one cycle's worth of such polled data. The method takes advantage of a communications network of the type having intermediate storage and a given message-switching message-propagating technology. Each data-destination party is provided with a message-switching address. Given the foregoing, each data communicator cyclically propagates a data message over the communications network by means of the given message-switching message-propagating technology and as addressed to the data-destination party, which data message contains a historical record of the polled data of at least the current cycle and as polled from the associated at least one on-premise ATG controller and at least one on-premise some other device or sensor.

Preferably the at least one other device or sensor is corresponded with a non-petroleum metric of the retail fuel station. Examples include proof-of-sales records, cooler temperature, a cathodic protection system, a door alarm, or ambient temperature. If the at least one other device or sensor is corresponded with either proof-of-sales or dispenser records, then this advantageously affords reconciliation with fuel depletion metrics obtained from the data of the respectively associated at least one ATG controller.

The communications network optionally comprises the Internet global computer network, or alternatively an Intranet. Either way, one example message-switching message-propagating technology could be comprises t least SMTP e-mail technology or a competitive analog thereto. If the communications network is the Internet, then the intermediate storage will be found at least in a data storage devices of ISP's.

The inventive method might optionally further comprise the steps of the data communicators of the data-origin parties receiving communications across the communications network from a party authorized to do so containing instructions to change message-propagating scheduling. The data-destination party can be any of a wholesaler, a dispatcher, an equipment vendor or a remote business office of the management over at least one retail fuel station.

Preferably each data communicator is pre-programmed with programming regarding a schedule to follow in matters of when to propagate data to the data destination party(ies). The parties might cyclically contact a selected time server over the communications network in order to coordinate time accurately among themselves. It is additionally preferred if the data communicator is equipped with a local storage device that has sufficient capacitance to save multiple cycle's worth of historic polled data.

Additional features and objects will be apparent in connection with the following disclosure of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 3:
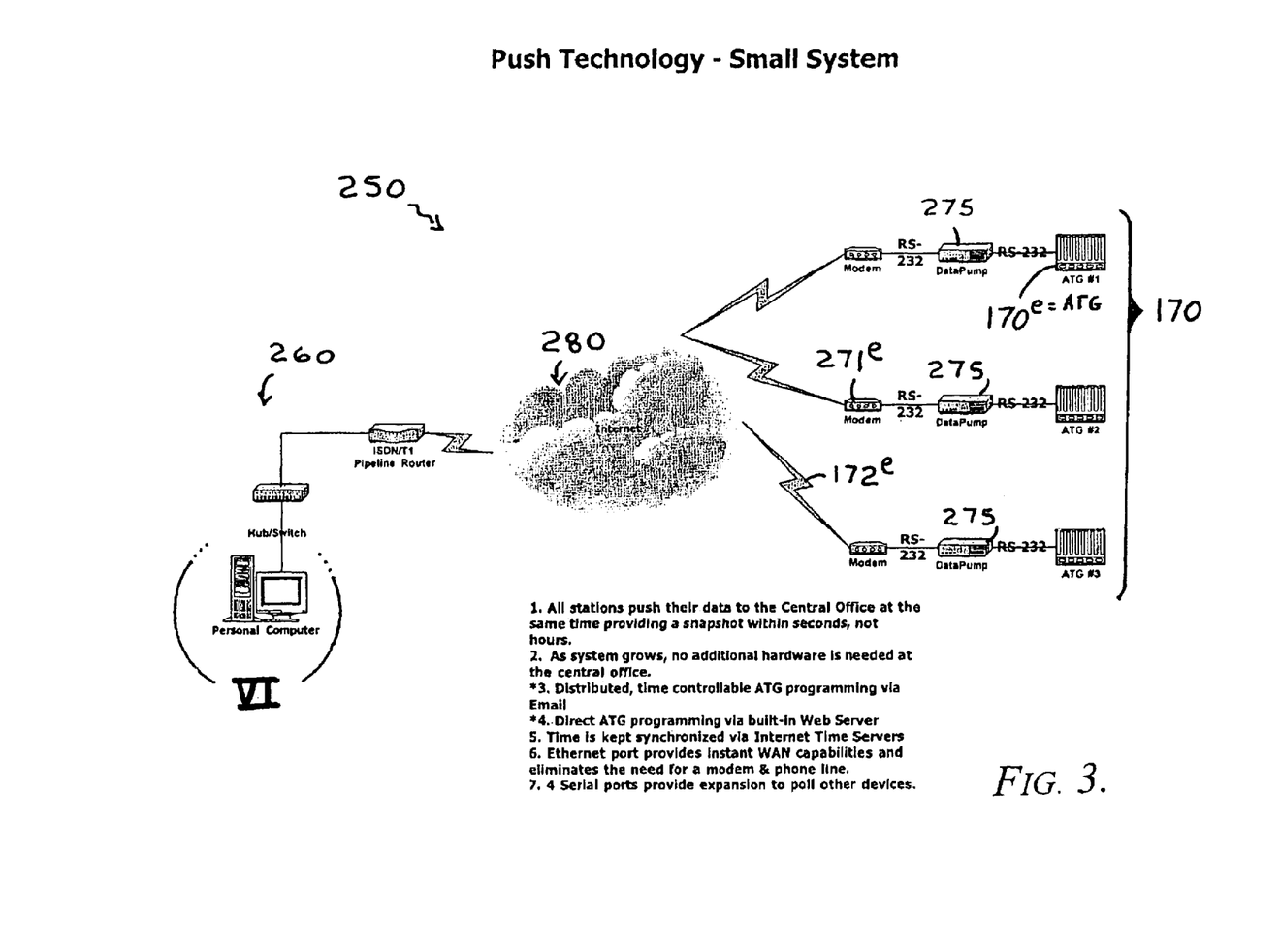
FIG. 3 is a diagrammatic view of technology in accordance with the invention for collecting data of in-tank fuel levels, it being referred to in this description as "push" technology for sake of a moniker both suggestive of the involved processes as well as suggestive of how to conceive various distinguishing aspects of the invention relative to the prior art.

FIG. 3 is a diagrammatic view of a technology and network 250 in accordance with the invention for collecting data of in-tank fuel levels from the bulk tanks of remote stations 170. The left side of the view comprises a diagrammatic depiction of a remote researcher or data "destination" party 260, such as a fuel wholesaler. The right side of the view comprises diagrammatic depictions of a population 170 of remote stations, which can be regarded as data "origin" parties. The invention provides advantages to the retail gas or service station industry, and indeed, especially for convenience store operations as more particularly described below. This technology is referred to in this description as "push" technology 250 for sake of a moniker both suggestive of the involved processes as well as suggestive of how to conceive various distinguishing aspects of the invention relative to the prior art.

The inventive push technology 250 is distinguishable from the prior art in several ways, including without limitation the following. Number one, the inventive push technology 250 has the data-origin parties 170 acting independently on their own to propagate (eg., push) the data to the data-destination party(ies) 260.

Number two, the inventive push technology 250 and the communications network 280 it is implemented on accommodates ready expansion over not just a burgeoning population of data-origin parties 170, but also an expanded number of data-destination parties 260. Such multiple data-destination parties 260 can be served all the data with no discrimination among them on basis of either content or timing (ie., neither data filtering nor delivery delay). Such multiple data-destination parties 260 might include the wholesaler, the retailer's business office, and the equipment vendor, as well as multiple departments of any one or the other. That is, the retailer might have a billing department monitoring fuel sales for accounting reconciliation purposes while having another department monitoring E.P.A. compliance.

Number three, the parties 170 and 260 to the invention propagate their communications (importantly, the data) by a message propagating technology known as message-switching (ie., in contrast to circuit or packet switching). Nowadays a very commonly recognized message-switching service is electronic-mail ("e-mail"). Established examples include SMTP (simple mail transfer protocol) and the International Telegraph and Telephone Consultive Committee (CCITT) X.400 series. It is believed that other options to date include without limitation SOAP (simple object access protocol). In contrast, the prior art technology of FIGS. 1 and 2 operates on circuit switching technology. That as well as packet switching technology are, more accurately, transmission technologies. With circuit switching, resources are originally expended to open a communications channel, after which other resources are used for holding onto and communicating across the channel, followed by expending further resources to close the channel. The public-switched telephone network (eg., 180 in FIG. 1) has historically relied heavily on circuit-switching technology to handle its communications traffic. On the other hand, Internet communications are typically handled by the transmission technology known as packet-switching and as more particularly explained by John N. Daigle, "Computer Communication Networks: General Networking Concepts," *The Engineering Handbook*, Chapter 128.1, pp. 1388–92 (CRC/IEEE Press, R. C. Dorf, Ed., 1995). In brief sum of point number three, the inventive push technology utilizes a message propagating technology that is referred to as message-switching technology and is similar in concept to the postal system.

Number four, the invention utilizes communications mediums 280 that have inherent message-storage capacitance independent of the capacitance of either a data-origin party 170 or data-destination party 260. Digression might be taken briefly here to consider the meaning of "capacitance" against "capacity" as used herein. "Capacitance" defines a measure of storage, such as data storage. A computer storage device (eg., a hard drive) has capacitance for storage of data. "Capacity" defines a measure of throughput, such as data throughput across a data channel. Alternatively, this is bandwidth. In sum, the invention utilizes communications mediums 280 that have "intermediate" storage. Intermediate storage is a term of art. Presumptively it refers to the fact the communications medium 280 is situated intermediate the ultimate origins and destinations of communications. Hence any storage capacitance independent of the ultimate origin or destination sites is situated intermediate" as well.

Number five, the data-origin and -destination parties 170 and 260 are provided with utilities to synchronize with a universal clock in order that each party 170 and 260 keep good local time for time-stamping and -correlating purpose. The foregoing are exemplary distinguishing characteristics of the invention and is by no means an exhaustive treatment. **** To turn more earnestly to FIG. 3, it shows an inventive way how a remote party 260 might research the data of a distributed population 170 of retail fuel stations, including the data that expresses or allows computation of in-tank fuel levels. Such remote parties 260 might include for example the fuel wholesalers, or the business management over such retail fuel station. Regardless, the remote party 260 can be reckoned as a data-destination party 260. In FIG. 3, the data-destination party 260 is denominated as "central office." The retail fuel stations 170 can be reckoned as data-origin parties. The data-origin parties 170 are, more particularly, sites $170^e$ characterized as being originators of data including that producible by at least one automated tank gauge (ie., "ATG") and attached controller $170^{e=ATG}$. Importantly, the data-origin parties 170 are served by a data communicator 275 in accordance with the invention. In the drawings, the data communicator 275 is denominated as the "DataPump" (or in some views, "NETDataPump"). More accurately, the DataPump 275 propagates data across the network 250.

The inventive data communicator 275 is configured for handling multiple tasks. One task includes polling the prior art ATG controller $170^{e=ATG}$ for its data. As described previously, example prior art ATG's have an attached controller $170^{e=ATG}$ which corresponds in-tank float level and temperature with in-tank fuel level. As also previously described, the in-built safety features as well as installation of prior art ATG's is entrusted to the expertise of experts. Instrumenting a bulk fuel tank with electronic sensors and conductors inside the tank is a risk for disaster if handled by no less than experts. Hence to date ATG design, certification, production and installation have been handled by an isolated industry of experts. In contrast, the inventive data communicator 275 is a product of design and protocol-compatibility considerations from a very different industry. The gap between the two industries probably explains why retail fuel sale issues are under-served by cross-over technology such as the invention.

One task of the inventive data communicator 275 which especially justifies its worthwhileness is the task of polling the ATG controller $170^{e=ATG}$ for its data. The data communicator 275 includes a processor and computer memory allowing for its functions to be executed according to programmed instructions. The data communicator 275 is programmed with a schedule for sequencing through its polling operations. The data communicator 275 has multiple serial ports, for example and without limitation four, in order to communicate with other devices $170^{e=other}$ (see, eg., FIG. 5). One such serial port affords connectivity to the controller $170^{e=ATG}$ of the ATG so that this direct connection eliminates any intervening modem between the data communicator 275 and ATG. The data communicator 275 polls the ATG for its data and then among other things, writes that data to local memory with an appropriate time stamp.

As said, the data communicator 275 has multiple ports for connection to multiple other devices $170^{e=other}$. These can monitor devices or sensors of choice including such that provide signals as 0–5 Vdc, 4–20 ma, TTL, switch contacts, thermistors and so on. The data communicator 275 can be programmed with the task of polling the data and/or monitoring the alarm messages of various other devices $170^{e=other}$ around the premise of the retail fuel station. Example other devices $170^{e=other}$ include the gas dispensers, the electronic proof-of-sales records (P.O.S.'s records, or eg., the register receipts), the power consumption and so on.

Pause can be taken to consider the worthwhileness of polling such other devices. Polling the proof-of-sales records allows reconciliation diagnostics. For example, the ATG data provides in-tank fuel depletion calculation and hence one benchmark of fuel sales. The proof-of-sales records provides another benchmark of fuel sold. The data acquired from the dispensers provides a third benchmark of fuel sold. These several benchmarks allow reconciliation diagnostics. If any of the benchmarks are too far apart, among other issues which will require investigation is if there might be any leakage or if the bulk-fuel equipment is out of E.P.A. compliance and so on.

Polling power consumption allows energy management diagnostics. Convenience stores typically consume significant electric power for among other things, night illumination and sign illumination. Such high-consumption illumination tends to be viewed by the convenience store industry as a routine cost-of-doing business. However, this is also high dollar overhead which as a cost item that has to be monitored closely for profitability.

Also, the data communicator 275 preferably polls the power consumption of the on-site refrigerators and freezers, as well as temperature data that can be obtained from sensors and/or controllers. The concern over refrigerators and freezers relates to the valuable inventory that these contain. If the feed of public-utility power is lost or cut, then the refrigerators and freezers are starved of power. Much of that valuable food stock will spoil if the power is cut too long and the temperature rises.

Hence the data communicator 275 can be arranged to poll such a variety of devices $170^{e=other}$ for their data so that the data acquired by the data communicator 275 over time includes not only the in-tank fuel levels of the bulk tanks, but also (i) alternative benchmarks of fuel sales such as dispenser data and proof-of-sales records, as well as (ii) power consumption of the nighttime and sign illumination, (iii) freezer and refrigerator service in order to among other things provide—in case of faulty service—an alternative alarm system to protect against spoliation of valuable perishable inventory, (iv) ambient store temperature, oven temperature, (v) impressed cathodic protection systems' voltage and current readings, and/or (vi) security monitoring of doors and safes. Indeed, the data communicator 275's serial ports accommodate monitoring over about anything that requires monitoring of a sensor.

For convenience store operations, the first biggest risk to profitability (or, in less dire terms, prospering well and operating smoothly) is depletion of fuel from the bulk tanks. It is believed that the second biggest risk to the same is cooler/freezer failure and the consequent spoliation of perishable food items.

It is a fact that, several of the devices $170^{e=other}$ and/or $170^{e=ATG}$ polled by the data communicator 275 have their own alarm systems. Neither the data communicator 275 at the data-origin site 170 nor the programming at the data-destination site 260 is separately analyzing for alarms picked-up from such other devices $170^{e=other}$. Nevertheless, if one device $170^{e=other}$ generates an alarm signal, then the data communicator 275 propagates that signal to the relevant destination party(ies) 260. An example device 170=other equipped with an alarm might be a freezer controller. The alarm might be triggered by events like loss of power, failure of the compressor to switch ON, crossing a temperature threshold, and so on. These devices all know what constitutes an alarm event. The data communicator 275 merely monitors for alarm signals and then relays (ie., propagates) such signals forward to the data-destination party(ies) 260. Nowadays the person(s) primarily responsible for attending to freezer alarms are the on-site store clerks. For the future, the invention provides an advantage such as publishing the alarm events of local devices $170^{e=other}$ to a broader audience 260.

The data communicator 275 is further scheduled to periodically assemble the data it has polled from the various devices $170^{e=ATG}$ and $170^{e=other}$ into a message, and propagate that message to the data-destination party 260. Preferably the data communicator 275 of given site #1 is programmed to propagate at the same time as the data communicators 275 at sites #2, #3 and so on. All the sites transmit on the same schedule. The data communicators 275 do this on a message propagation technology referred to above as message-switching technology. SMTP e-mail is an example. All the data communicators 275 "pump" (or push or propagate) their data onto the communications network 280, which in this view is represented by the Internet Presumptively for the remote sites, this will require the data communicator 275 be served by a modem $271^e$.

The preferred types of communications network 280 for implementing the invention preferably are preferably characterized by having practically limitless capacitance for accepting all the messages propagated simultaneously by all the data communicators 275 on the network 250. In this view, the example communications network 280 is represented by the Internet. The messages might not all reach the data-destination party 260 in unison, but the data communicators 275 can be programmed to propagate in unison. The postal system counter-part to this might be likened to tax day when taxpayers mail their tax returns through the U.S. mail. For the U.S. postal service, filing deadline April 15 is a heavy traffic day. Nevertheless, the U.S. postal service has the capacitance to accept all that mail. Its capacity to transport all that mail at once is a different issue. On a heavy intake day, it might take the U.S. postal service longer to ultimately sort through and deliver all that mail. Another example of this might be holiday cards around the holiday season. The public is advised to get their cards in the mail by December 10 if they really wish to be fairly assured of delivery in two weeks time. Other times of the year when there's less traffic, mail moves more quickly.

The communications network 280 (eg., the Internet in FIG. 3) transports and stores the messages as is well known, until ultimately the data-destination party 260 is enabled to pop off the messages in its own time. Relatively speaking, this time frame is fairly swift. Since all the data-origin sites 170 push their data at the same time, this affords the data-destination site 260 with an opportunity to take a "snapshot" of the data within seconds, not hours. It is an aspect of the invention that the data-destination party 260 gets data of all the sites in one swift moment, and not serially one at a time over several hours as the case with the prior art technology of FIGS. 1 and 2.

In some situations, the data communicator 275 of a data-origin site might not succeed at contacting the communications network 280, especially if contact with the communications network 280 is dependent on a modem $271^e$ and phone line $172^e$. Remote sites contacting the Internet by dialing through a modem $271^e$ face such a situation. Perhaps the phone line $172^e$ that a particular data communicator 275 uses is temporarily tied up by the store clerk. Regardless, the data communicator 275 retains its message as well as the underlying data onboard with its local memory. The data communicator 275 can endlessly test the phone line $172^e$ to determine if its free, and when it is, then the data communicator 275 can then seize the phone line $172^e$ and send its message.

During the times that the individual data communicators 275 are in contact with the communications network 280, each one contacts a selected time server and to synchronize its onboard clock. That way, the data communicator 275's clock is perpetually resynchronized against a trustworthy clock. Thus each data communicator 275, during the interim until its next cycle when it checks the selected time server, should keep reasonably accurate time. As a result, the local onboard clock is not entrusted with being accurate over long stretches of time (months or years) without synchronization. Preferred time servers for this purpose include official U.S. time provided by an Internet site or the like.

Given the foregoing, various aspects of the invention can be better described. Unlike the prior art example of FIGS. 1 and 2, in FIG. 3 now, the matter whether a data-origin site 170 propagates its data to a data-destination site 260 is a matter programmed at the data-origin site 170 by virtue of the data communicator 275. To turn around and consider the data-destination site 260, it is not programmed with an exclusive list of data-origin sites 170 under its responsibility. Instead, the data-destination site 260 passively accepts the data which gets propagated to it. This can be compared to U.S. mail the following way. With holiday greeting cards, the card-origin party addresses and sends cards according to the card-origin party's address list. Any given card-destination party simply passively accepts the card when delivered.

Figure 4:
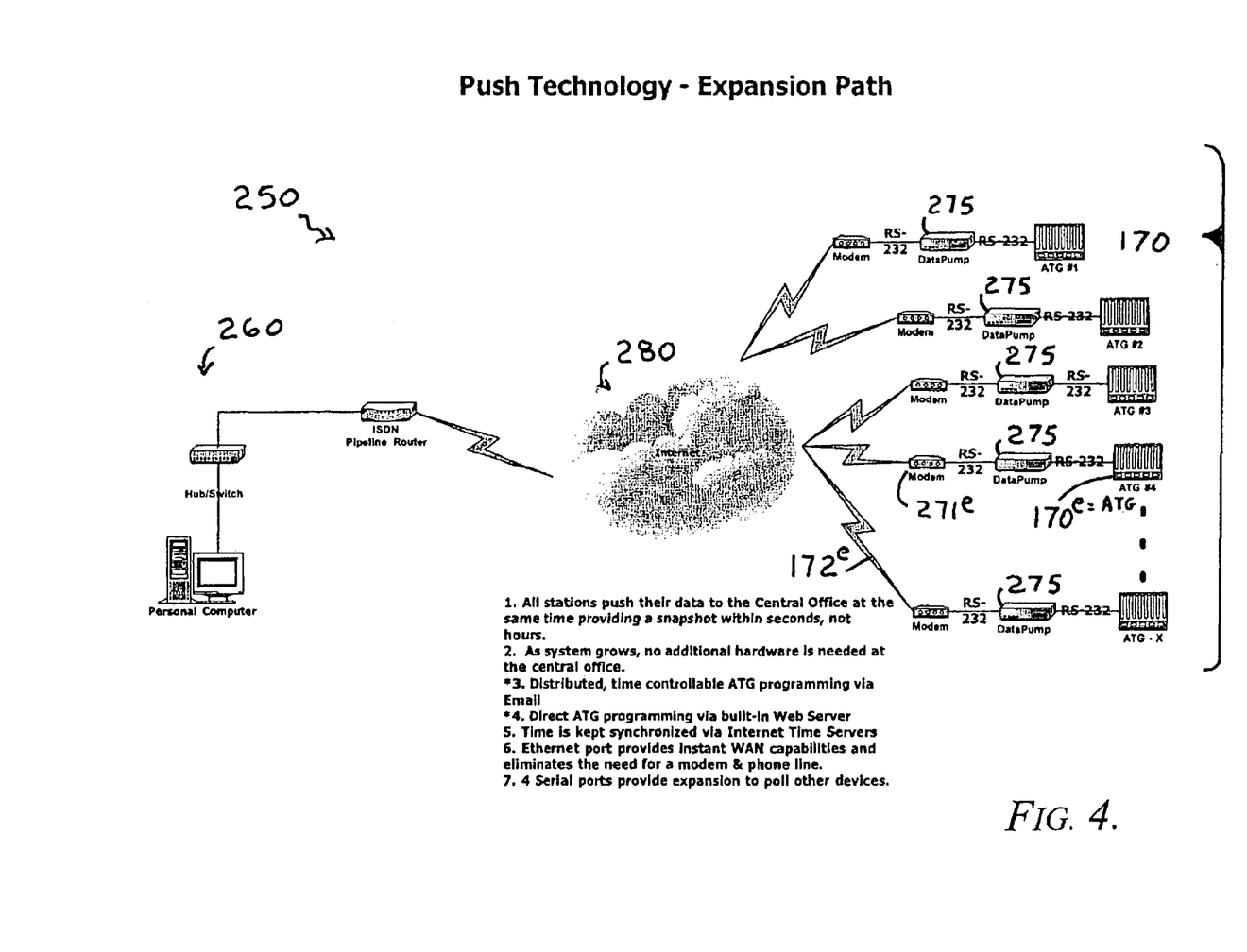
FIG. 4 is a diagrammatic view of how the inventive "push" technology of FIG. 3 in combination with the types of communications networks it preferably is implemented on, has/have the inherent adaptability—and without modification or compromise in performance—for handling a burgeoning or "expanded" population of fuel tanks.
Figure 7:
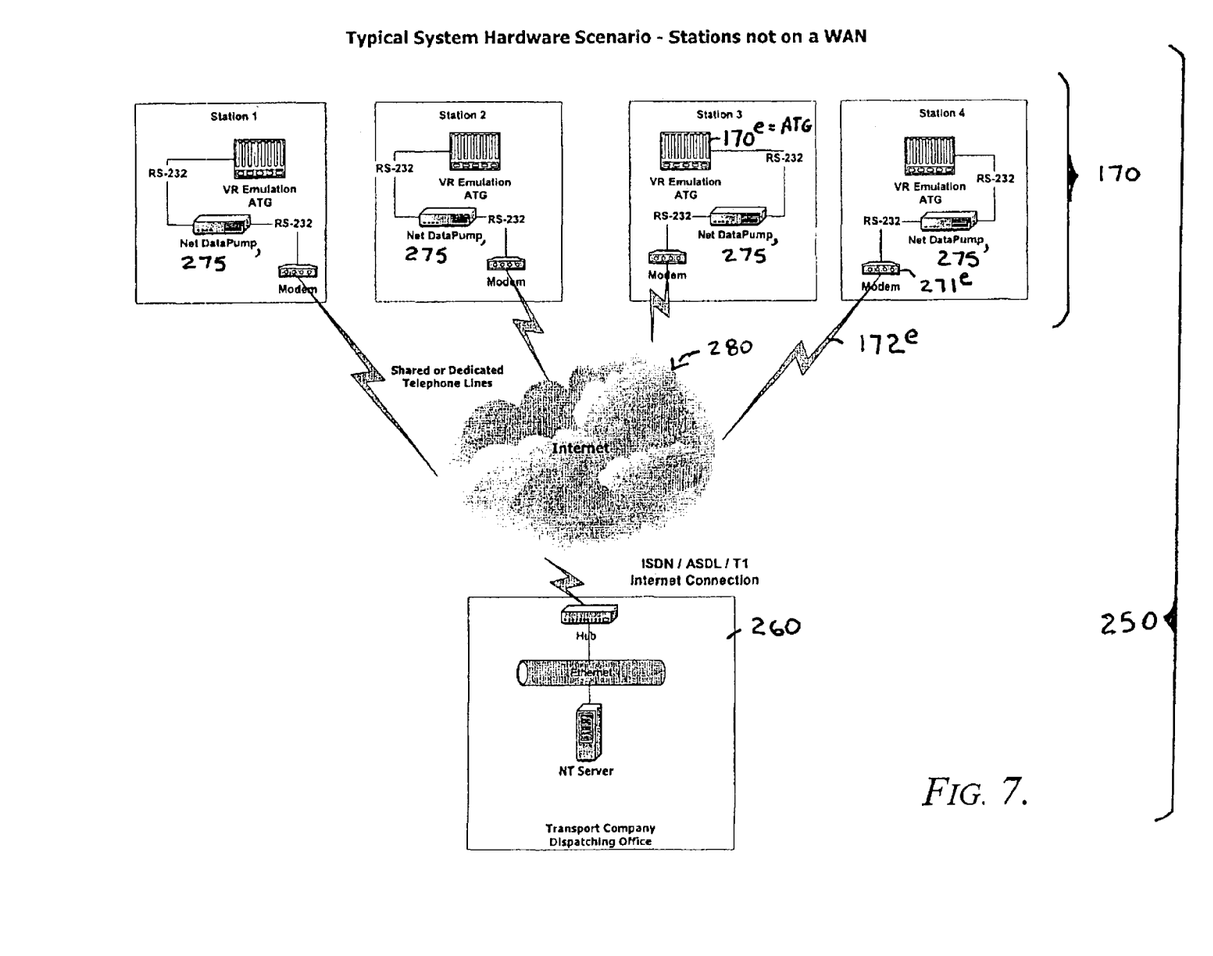
FIG. 7 is a diagrammatic view of one preferred type of communications network for implementation of the "push" technology in accordance with the invention, and that being namely the Internet.
Figure 8:
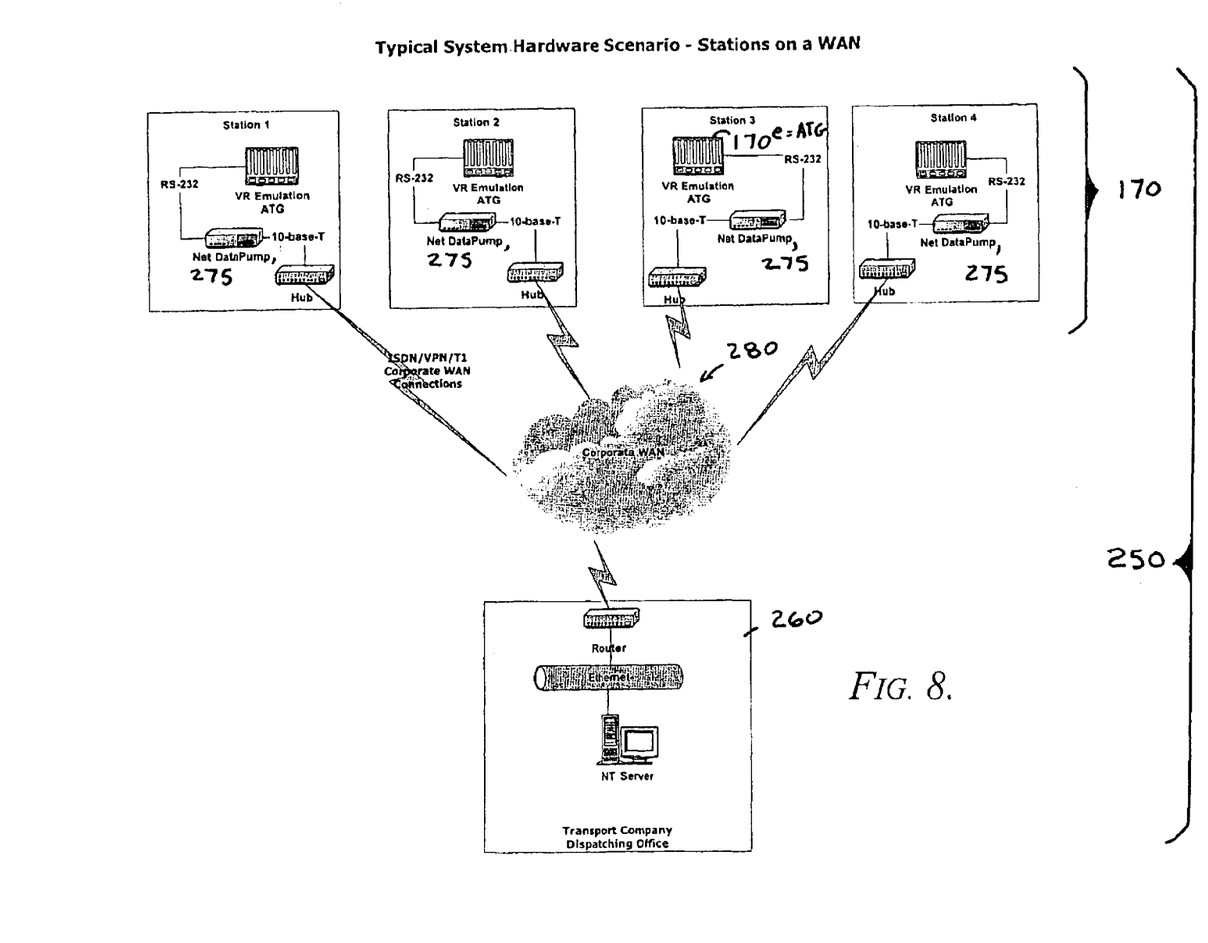
FIG. 8 is a diagrammatic view comparable to FIG. 7 except showing an alternate preferred type of communications network for implementation of the "push" technology in accordance with the invention, and that being namely a private or virtual private network commonly referred to as a wide area network.

To turn to FIG. 4, it shows that the inventive "push" technology and network 250 of FIG. 3 in combination with the communications network 280 it is implemented on is/are inherently adaptable, and without modification or compromise in performance, for handling a burgeoning or "expanded" population of data-origin sites 170. FIG. 4 depicts data-origin sites 170 characterized by ATG #1, ATG #2, ATG #3, ATG #4 and so on, indefinitely, through the data-origin site of ATG-X. As previously discussed, the invention takes advantage of the communications network 280 it is implemented on partly as a vast resource for accepting thousands of data-messages from thousands of data communicators 275 at one time. FIGS. 7 and 8 show example preferred communications networks 280 having this capability, one being certainly the Internet and another (among others) being a private or virtual private networks such as a LAN (large area network) or WAN (wide area network).

For example, consider the Internet. The Internet has the capacitance to accept all those message communications at once because of the vast population of distributed computer resources that compose the Internet. The Internet readily has the capacity to deliver those messages to at least one mail server proximately associated with the data-destination party 260, at least within a relatively swift time frame. Prospectively, the bottleneck with capacity (ie., rate of throughput) likely lies in the time it takes the computer resources at the data-destination site 260 to download or pop off its mail. To consider again a U.S. mail analogy, this might be likened to a distributed population of credit-card holders paying their monthly statements. The payment-originating parties might all mail their payments on one day. Presumptively the U.S. postal service has the capacitance to accept all that mail at once. Presumptively the U.S. postal service likely has the capacity to deliver all that mail to the payment-destination center more or less in unison. The likely bottleneck lies with the payment-destination center and its ability to open all that mail in any short time frame, let alone the process of crediting each account with the respective payment.

Figure 5:
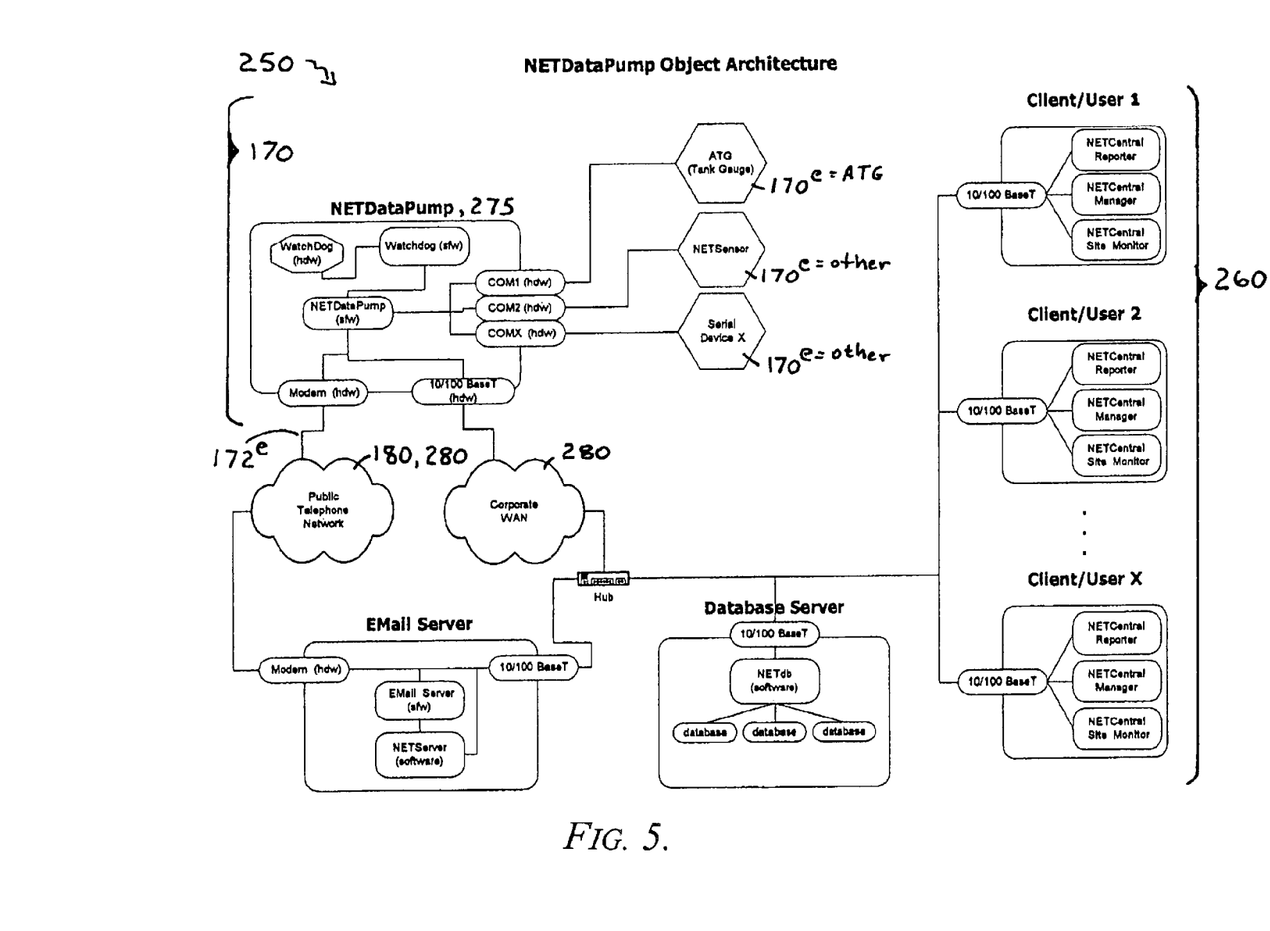
FIG. 5 is a diagrammatic view that—in contrast to FIG. 2 or 4 which deal with expansion of the number of fuel tanks on the network (ie., the data "origin" parties)-relates to a burgeoning or expanding population of other parties on the network, these namely being data "destination" parties, wherein the inventive "push" technology of FIG. 3 in combination with the types of communications networks it preferably is implemented on is/are readily adaptable for handling a burgeoning or "expanded" population of data "destination" parties.

FIG. 5 shows, in contrast to FIG. 4, that the "push" technology 250 in accordance with the invention in combination with the communications network it is implemented on readily accommodates expansion of (eg., increasing) the number of data "destination" parties 260. For brevity's sake, FIG. 5 depicts a single data-origin party 170. However, this single data-origin party 170 is representative of a large population of comparable other data-origin parties.

The representative data-origin party is characterized by a data communicator 275 in accordance with the invention (denominated in this view as "NETDataPump"). The data communicator 275 is shown in a simplified block format as comprising the main NETDataPump software package linked to multiple serial ports COM1, COM2 and so on through COMX. COM1 is shown connected to an ATG controller $170^{e=ATG}$ because the remote monitoring of in-tank fuel levels is the task which justifies the worthwhile-ness of the invention. COM2 is shown connected to an alternative sensor device $170^{e=other}$ such as and without limitation a cooler (ie., temperature) sensor. And so on for the rest of the utilized ports, wherein COMX is shown connected to a generic serial device X $170^{e=other}$ which can be any other device on or proximately associated with the premises of the retail fuel station. A non-exclusive list of examples include the dispenser(s), the proof-of-sales register(s), the safe, and so on.

The NETDataPump 275 polls data from these devices on COM1, COM2 and so on through COMX, according to its programming. The NETDataPump periodically assembles the polled data into a message and propagates that message onto the communications network 280 according to scheduling programmed into its own programming; FIG. 5 shows that the data message is transmitted as an original matter via modem $271^e$ and the public (ie., public-switched) telephone network 180 onto the Internet 280. However, FIG. 5 shows that in the alternative the NETDataPump 275 can contact a data-destination party 260 through Ethernet connectivity such as a large or wide area network 280 (ie., LAN or WAN) or the like if computer resources are available to construct such a connection between the remote station 170 and the data-destination office 260. If transmitted by e-mail across the Internet 280, the e-mail services provided by any of a variety of customary Internet parties attends to delivery of the e-mail to the data-destination party. Presumptively, one such party might be an Internet Service Provider (ISP, not shown) of the data-destination party 260. Whereas universal meanings for LAN and WAN might not be agreed upon, one way to distinguish the two might be the following. A LAN might be constructed almost entirely of private resources. A WAN might interconnect together an assortment of LAN's through leased third-party or public resources such as leased fiber or the Internet respectively. Is such LAN's or WAN's implement comparable protocols and utilities as the Internet they are then often referred to as Intranets.

Staying in FIG. 5, the data-destination party 260 might be constructed to write the data on a database server which serves a population of client/users shown as Client/User 1, Client/User 2 and so on through Client/User X. Examples of who these might be include the following. That is, Client/User 1 might be the dispatch office responsible for seeing that the bulk fuel tanks of the data-origin sites don't run dry. Client/User 2 might be a compliance office that monitors for situations indicating a need to conduct tank tests, line tests and so on to research out any questions of leakage. Client/User X might be a maintenance/service department responsible over pump problems (eg., as in-tank pumps) and dispenser problems (ie., the terminal gear which includes the nozzle customers insert in their car's gas-tank filler neck).

The various Client/Users 1, 2 and so on through X could have gotten their data by alternative means. That is, at some original time the NETDataPump 275 of each data-origin site could have been pre-programmed with the mail addresses of each of Client/User 1, Client/User 2, and so on through Client/User X. This is readily accomplishable in e-mail communications with multiple-party addressing. In effect the address list is a broadcast list. Hence every time a data-origin party propagates a data package, the data package is propagated concurrently to every addressee on the broadcast list. In fact, the open protocols on the Internet or Intranets for implementing mail services do the actual work of making duplicate copies of the content portion of the data message. Given the foregoing, the "push" technology 250 in accordance with the invention in combination with preferred types of communications networks 280 the invention is implemented on expediently handle expansion to handle multiple data-destination parties 260. The invention readily accommodates thousands and thousands of data-origin parties 170 as well as dozens and dozens of data-destination parties 260. The task of establishing a new (and additional) data-destination party 260 on the network 250 is programming task accomplished at not the data-destination site 260 but each applicable data-origin site 170.

A moment can be taken to consider the job of programming the distributed population of NETDataPumps 275. Assume a network of thousands of NETDataPumps 275. Assume also a change in conditions wherein a network supervisor desires to program all of the thousands of NETDataPumps 275 such that, henceforth, each is to add an additional data-destination party 260 to its broadcast list. The NETDataPump 275 in accordance with the invention affords the network supervisor with various utilities to accomplish this end. That is, utilities are provided that allow the network supervisor to e-mail each of the thousands of NETDataPumps 275 with an instruction to add the additional data-destination party 260 to the distribution list. The network supervisor's task involves simply that of composing a very modest e-mail message with the change instruction in it. The network supervisor is presumptively in possession of a master broadcast list which will include all the e-mail addresses of the data-origin sites 170 that will be selected as recipients of that change instruction. Hence the network supervisor is only trivially tasked to compose and send one e-mail message. The network supervisor's relatively more hefty chore, if any bother at all, is to ensure that the broadcast list is complete and accurate. That way, each time any NETDataPump 275 contacts the communications network 280 to send an e-mail message, it retrieves the messages that await it, presumptively from the network supervisor.

Alternatively still, each NETDataPump 275 can be constructed (ie., installed) with a modest package of web serving software. At some time when the NETDataPump 275 is online, the network supervisor (or other relevant party) can accomplish direct programming through browser utilities. The NETDataPump 275 can be caused to be online by various techniques. It might normally sit offline except at times scheduled to transmit e-mails, upon which event it might be instructed in an incoming e-mail to connect online and contact the network supervisor. More simple still is if the remote NETDataPump 275 is linked permanently online by means of a cable or wide area network (WAN) or the like. Other techniques are available including the relatively low-concept technique of a person-to-person phone call into the retail gas station, with the calling party asking the answering clerk to attend personally to switching the NETDataPump 275 online. It is a further aspect of the invention that a party such as an equipment vendor can undertake remote diagnostics with the ATG through dial-in utilities to the NETDataPump 275 and thereafter use approved tank gauge manufacturer's software packages and recommended procedures for such diagnostics.

To reference FIG. 5 once more before leaving it, the representative NETDataPump 275 includes a hardware and software package denominated as "WatchDog." This can be likened to the watchman's song of medieval lore (eg., "It's 9 o'clock and all is well"). The WatchDog's data can be monitored by a chosen WatchDog-data destination party for integrity purposes. Presumptively a NETDataPump 275 which fails to propagate WatchDog data on schedule is experiencing difficulties. The WatchDog-data destination party who notices inactive NETDataPumps 275 which should be active can research the matter further as necessary. For example, perhaps the phone line $172^e$ of that particular NETDataPump 275 is busy or cut, or else there may indeed be malfunctioning with the NETDataPump 275.

Figure 6:
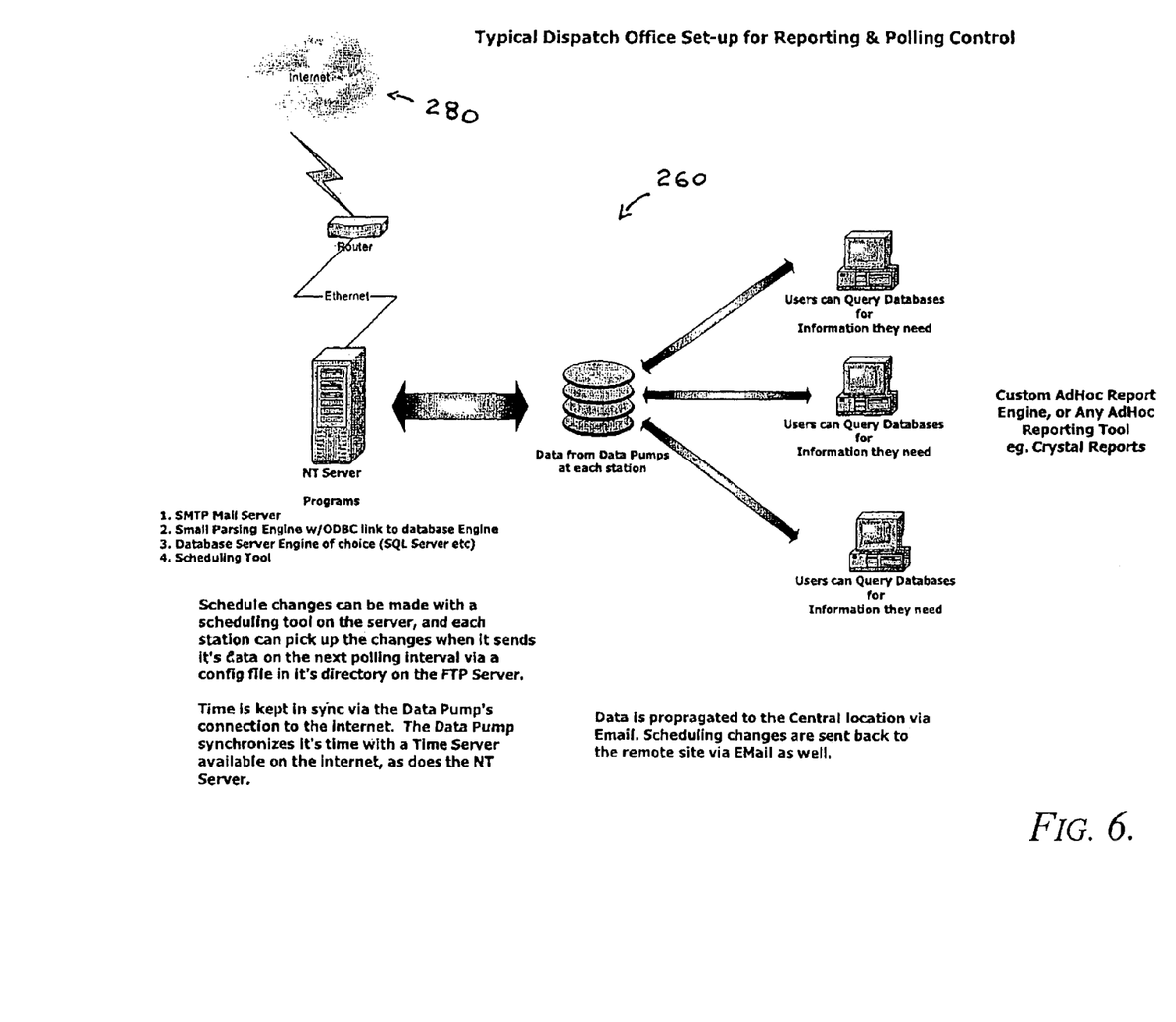
FIG. 6 is a diagrammatic view of detail VI in FIG. 3 to illustrate the preferred computer services for providing a data "destinations party with in order to capably implement the advantages of the invention.

FIG. 6 is a diagrammatic view of detail VI in FIG. 3. In FIG. 6, this view illustrates the computer services that are preferred in accordance with the invention for equipping a data-destination party 260 with capability to implement the advantages of the invention. The data-destination party 260 is shown provided with a modest general purpose computer such as for example and without limitation an NT server, configured in part with an SMTP mail server or the like for receiving the data-messages propagated from the populous data-origin sites (none shown in FIG. 6). The NT server preferably includes a small parsing engine with and ODBC link to a database engine and data storage preferably attached to the data-destination party 260's LAN or WAN. The data-destination party 260's preferred computer resources further include a database server engine of choice, for example and without limitation an SQL server or the like. Additionally, data-destination party 260's preferred computer resources include further still a scheduling utility.

Given the foregoing, the data-destination party 260 can utilize the scheduling utility to change the schedules the data-origin parties operate on (no data-origin parties shown). The data-destination party 260 has a configuration file in its directory applicable for each data-origin party. The data-origin parties propagate data-messages according to each's most current schedule programming. The data-destination party 260, in response to the incoming data-message, propagates back a responsive message incorporating the change instructions. One cycle or another, each data-origin party receives its change-instruction e-mail.

Time is synchronized among the data-destination parties 260 and data communicators 275 (not in view in FIG. 6) by connection to the Internet. Each data communicator 275 synchronizes its time with a selected time server as does the data-destination party(ies) 260 so that all parties and entities 260 and/or 275 are fairly synchronized.

FIG. 6 shows that the data-destination party 260 comprises a population of users (eg, there being three such users shown for sake of illustration). Each individual user is enabled to query the database for the information each needs. The individual users are preferably provided with ad hoc reporting tools including without limitation not only custom ad hoc report engines but also commercially available ones such as Crystal Reports™ or the like.

FIG. 7 shows one preferred type of communications network 280 for implementation of the "push" technology 250 in accordance with the invention. Namely, it is the Internet. Among other desirable attributes of the Internet are that the Internet provides intermediate storage for message traffic and that the Internet supports use of message-switching message propagating technologies such as SMTP e-mail or CCITT X.400 e-mail and the like. FIG. 8 is comparable to FIG. 7 except showing an alternate preferred type of communications network 280 for implementation of the "push" technology 250 in accordance with the invention. In FIG. 8, the preferred network is denominated a WAN. It can comprise private elements as well as leased or public elements such as leased fiber or the Internet respectively, to create what is known as virtual private network (VPN). Like with the Internet, the desirable attributes of such a communications network ought to include that it provides intermediate storage for message traffic and that it supports use of message-switching message propagating technologies. Sometimes these are referred to as Intranets.

In view of all of the above, the "push" technology according to the invention in combination with the preferred communications networks it is implemented on provide various advantages for retail fuel stations over the prior art, including the non-exhaustive listing of such that follows.

First, the inventive push technology has the data-origin parties acting independently on their own to propagate (eg., push) the data to the data-destination party(ies).

Second, the inventive push technology and the communications network it is implemented on accommodates ready expansion over not just a burgeoning population of data-origin parties, but also an expanded number of data-destination parties.

Third, the parties to the invention propagate their communications (importantly, the data) by a message propagating technology known as message-switching (ie., in contrast to circuit or packet switching), common examples of which include SMTP e-mail and CCITT X.400 series e-mail.

Fourth, the invention utilizes communications networks that provide intermediate storage of message traffic for situations in which the invention floods the communications network with thousands of messages on a given, pre-determined instant. The communications network is relied on for sufficient capacity to deliver the flood to a single data-destination party relatively swiftly. The expected bottleneck with this scenario is expected to lie with not the communications network but the computer resources of the data-destination party.

Fifth, the data-origin and -destination parties are provided with utilities to synchronize with a universal clock in order that each party keep good local time for time-stamping and -correlating purpose.

It is an aspect of the invention to provide instantaneous snapshots of the in-tank fuel levels of the sites on the network.

It is another aspect of the invention to switch the responsibility of a busy telephone line at the retail fuel station as being a problem for the data-destination party to work around, to a problem for the data-origin site to work around. Presumably, the data-origin site is under-tasked anyway, or at least relative to the data-destination site, and is nearer the problem in any event.

It is an additional aspect of the invention to eliminate the need to pre-program the central office with the identities and/or addresses of all the data-origin parties on the network because the invention has the data-destination party sitting passively awaiting for new data-origin parties to contact it. Afterwards, the data-destination party creates an account for the new data-origin party(ies) and then might monitor their WatchDog messages in order to detect failure to meet the schedule. Indeed it is an aspect of the invention to assign one data-destination party on the network with duties over monitoring non-reporting sites.

It is an alternate aspect of the invention to change the party for siting the proprietary communications software specific to the ATG from being the central office in accordance to the prior art to the data-origin site in accordance with the invention. Not only is there no need under the invention for such proprietary software at the data-destination site, but furthermore there is no need for network-aware versions thereof because the invention also eliminates all need for surplus computers parallel- or multi-tasking alongside a given one in order to divide up and shotgun through at a faster pace the slow and cumbersome polling task.

It is a further aspect of the invention to simplify the computer resources required to obtain reports on the data.

It is a yet another aspect of the invention to eliminate any role for or reliance on the store clerks that staff the retail fuel stations.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method allowing a distributed population of retail fuel stations to provide at least one remote party with a "snapshot" of the in-tank fuel levels of the bulk fuel tanks of all the retail fuel stations in said population as well as data obtained from some other on-premise device or sensor, comprising the steps of:

configuring a distributed population of retail fuel stations as data-origin parties of in-tank fuel level data from the on-premise bulk fuel tanks as obtained from controllers of automated tank gauges (ATG's) as well as being an origin of data obtained from some other on-premise device or sensor;

providing each data-origin party with an on-premise data communicator that has a processor and memory and is associated with and cyclically polls at least one on-premise ATG controller and at least one on-premise some other device or sensor for data thereof, and pre-programmed with a cyclic schedule and stores locally in the memory at least several cycles worth of such polled data;

providing a communications network having intermediate storage and a given message-switching message-propagating technology;

providing a data-destination party with a message-switching address;

each data communicator in the population programmed with a schedule containing appointed times such that at any given appointed time, each independently but essentially simultaneously executes an instruction set for the propagation of a data message over the communications network by means of the given message-switching message-propagating technology and as addressed to the data-destination party, which data message contains a historical record of the polled data of at least the current cycle and as polled from the associated at least one on-premise ATG controller and at least one on-premise some other device or sensor: whereby after some time lapse that affords the data messages of the population opportunity to propagate their own independent way through the network and reach, not all at the same instant, the address of the data-destination party, then the data-destination party affords research into the data on a "snapshot" basis for that given time and successively for successive given times.

2. The method of claim 1 wherein any given associated at least one other device or sensor is corresponded with either proof-of-sales or dispenser records which thereby affords reconciliation with fuel depletion metrics obtained from the data of the respectively associated at least one ATG controller.

3. The method of claim 1 further comprising the steps of the data communicators of the data-origin parties receiving communications across the communications network from a party authorized to do so containing instructions to change message-propagating scheduling.

4. The method of claim 1 wherein the data-destination party comprises any of a wholesaler, a dispatcher, an equipment vendor or a remote business office of the management over at least one retail fuel station.

5. The method of claim 1 wherein parties periodically contact a selected time server over the communications network in order to coordinate time accurately among themselves.

6. The method of claim 1 wherein any given associated at least one other device or sensor is corresponded with a non-petroleum metric of the retail fuel station.

7. The method of claim 6 wherein the non-petroleum metric comprises any of proof-of-sales records, cooler temperature, a cathodic protection system, a door alarm, or ambient temperature.

8. The method of claim 1 wherein the communications network comprises the Internet global computer network.

9. The method of claim 8 wherein the message-switching message-propagating technology comprises at least SMTP e-mail technology or a competitive analog thereto.

10. The method of claim 8 wherein the intermediate storage comprises at least the data storage devices of ISP's.

11. A method allowing a distributed population of retail fuel stations to propagate messages over the Internet global computer network by message-switching message-propagating technology in order to inform at least one remote party of the in-tank fuel levels of the bulk fuel tanks of all the retail fuel stations, comprising the steps of:

configuring a distributed population of retail fuel stations as data origin parties of in-tank fuel level data from the on-premise bulk fuel tanks as obtained from controllers of automated tank gauges (ATG's) as well as being an origin of data obtained from some other on-premise device or sensor;

providing each data-origin party with an on-premise data communicator that has a processor and memory and is associated with and polls at least one on-premise ATG controller and at least one on-premise some other device or sensor for data thereof, and pre-programmed with a cyclic schedule and stores locally at least one cycle's worth of such polled data;

providing each on-premise communicator with a connection to the Internet global computer network including the intermediate storage capacity inherent thereto and at least one given message-switching message-propagating technology associated therewith;

providing a data-destination party with a message-switching address;

each data communicator cyclically propagating a data message over die network by means of the given message-switching message-propagating technology and as addressed to the data-destination party, which data message contains a historical record of the polled data of at least the current cycle and as polled from the associated at least one on premise ATG controller and at least one on-premise some other device or sensor.

12. The method of claim 11 wherein any given associated at least one other device or sensor is corresponded with a non-petroleum metric of the retail fuel station comprising any of proof-of-sales records, cooler temperature, a cathodic protection system, a door alarm, or ambient temperature.

13. The method of claim 11 wherein any givers associated at least one other device or sensor is corresponded with either proof-of-sales or dispenser records which thereby affords reconciliation with fuel depletion metrics obtained from the data of the respectively associated at least one ATG controller.

14. The method of claim 11 wherein the message-switching message-propagating technology comprises at least SMTP e-mail technology or a competitive analog thereto; and the intermediate storage capacity inherent to the Internet system of global computer inter-networked networks comprises at least the data storage devices of ISP's.

15. The method of claim 11 further comprising:

pre-programming all the data communicators with a same periodic schedule to follow in matters of when to propagate data to the data destination party(ies) as well as in matters of periodically contacting a selected time server over communications network in order to coordinate time accurately among themselves, whereby periodically, according to the periodic schedule, all the data communicators essentially simultaneously launch a data message onto the network which affords the data-destination party(ies) to essentially re-construct a "snap-shot" of the data, after arrival of all the current period's data messages allows that.

16. A method of pushing the data of the in-tank fuel levels of the bulk fuel tanks of a distributed population of retail fuel stations across a network to at least one data-destination parry for such data, comprising the steps of:

configuring a distributed population of retail fuel stations as data-origin parties of in-tank fuel level data from the on-premise bulk fuel tanks as obtained from controllers of automated tank gauges (ATG's);

providing each data-origin party with an on-premise data communicator that has a processor and memory and is associated with and cyclically polls at least one on-premise ATG controller, and pre-programmed with a cyclic schedule and stores locally a historical record of at least several of the last cycles' worth of such polled data;

providing a communications network having intermediate storage and a given message-switching message-propagating technology;

providing a data-destination party with a message-switching address;

each data communicator periodically propagating a data message over the communications network by means of the given message-switching message-propagating technology and as addressed to the data destination party, which data message contains the data of the at least last-in-time cycle as polled from the associated at least one on-premise ATG controller.

17. The method of claim 16 wherein the communications network comprises the Internet system of global computer inter-networked networks, the message-switching message-propagating technology comprises at least SMTP e-mail technology or a competitive analog thereto, and the intermediate storage is inherent to the Internet system of global computer inter-networked networks and includes at least the data storage devices of ISP's.

18. The method of claim 16 further comprising:

pre-programming all the data communicators with a same periodic schedule to follow in matters of when to propagate data to the data destination party(ies) as well as in matters of periodically contacting a selected time server over communications network in order to coordinate time accurately among themselves, whereby periodically, according to the periodic schedule, all the data communicators essentially simultaneously launch a data message onto the network which affords the data-destination party(ies) to essentially re-construct a "snap-shot" of the data, after arrival of all the current period's data messages allows that.

19. The method of claim 16 wherein the data communicators are pre-programmed to combine a history of several cycles-worth of polled data in each data message.

20. The method of claim 16 wherein the data communicators are father configured to poll cyclically at least some other on-premise data-supplying device or sensor for some non-petroleum metric of the retail fuel station, comprising any of proof-of-sales records, dispenser records, cooler temperature, a cathodic protection system, a door alarm, or ambient temperature; whereby either proof-of-sales or dispenser records thereby affords reconciliation with fuel depletion metrics obtained from the data of the respectively associated at least one ATG controller.

* * * * *